United States Patent [19]

Kotera et al.

[11] Patent Number: 4,889,996
[45] Date of Patent: Dec. 26, 1989

[54] METHOD FOR OBTAINING A RADIATION IMAGE

[75] Inventors: Noboru Kotera; Shusaku Eguchi, both of Odawara; Norio Miura, Isehara, all of Japan

[73] Assignee: Kasei Optonix, Ltd., Japan

[21] Appl. No.: 881,522

[22] Filed: Jun. 30, 1986

Related U.S. Application Data

[60] Continuation of Ser. No. 696,843, Jan. 29, 1985, abandoned, which is a continuation of Ser. No. 504,737, Jun. 16, 1983, abandoned, which is a division of Ser. No. 317,779, Nov. 3, 1981, abandoned, which is a continuation-in-part of Ser. No. 159,848, Jun. 16, 1980, abandoned.

[30] Foreign Application Priority Data

Jun. 19, 1979 [JP] Japan ................... 54-77290
Jun. 19, 1979 [JP] Japan ................... 54-77291

[51] Int. Cl.$^4$ .................. C09K 11/61; C09K 11/62
[52] U.S. Cl. .................. 250/484.1; 250/327.2; 252/301.4 H
[58] Field of Search ............... 252/301.4 H; 250/484.1, 250/327.2

[56] References Cited

U.S. PATENT DOCUMENTS 2,303,917 12/1942 Dietz ........................... 252/301.4 H
3,667,921 6/1972 Grodkiewicz et al. ..... 252/301.4 H X Primary Examiner—Jack Cooper
Attorney, Agent, or Firm—Gerald J. Ferguson, Jr.

[57] ABSTRACT

A radiation image storage panel for obtaining a radiation image of an object by causing said panel to absorb a radiation transmitted through said object and then exposing the panel to light of wavelength ranging from 450 to 800 nm to cause the panel to release radiation energy stored therein as fluorescent light, said panel having a fluorescent layer of a rare earth element activated complex halide stimulable phosphor represented by the formula

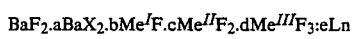

wherein X is at least one halogen selected from the group consisting of chlorine, bromine and iodine, $Me^I$ is at least one alkali metal selected from the group consisting of lithium and sodium, $Me^{II}$ is at least one divalent metal selected from the group consisting of beryllium, calcium and strontium, $Me^{III}$ is at least one trivalent metal selected from the group consisting of aluminum, gallium, yttrium and lanthanum, Ln is at least one rare earth element selected from the group consisting of divalent europium ($Eu^{2+}$), cerium and terbium, and a, b, c, d and e are numbers satisfying the conditions of $0.90 \leq a \leq 1.05$, $0 \leq b \leq 0.9$, $0 \leq c \leq 1.2$, $0 \leq d \leq 0.03$, $10^{-6} \leq e \leq 0.03$ and $b+d \neq 0$, respectively. A radiation image storage panel is produced by depositing on a support a fluorescent layer of the above-mentioned phosphor. The radiation image storage panel of this invention has higher sensitivity than the conventional radiation image storage panel having a phosphor layer of the conventional rare earth element activated divalent metal fluorohalide phosphor.

5 Claims, 6 Drawing Sheets

METHOD FOR OBTAINING A RADIATION IMAGE

This application is a continuation of Ser. No. 696,843, filed Jan. 29, 1985, now abandoned, which is a continuation of Ser. No. 504,737, filed June 16, 1983, now abandoned, which is a divisional of Ser. No. 317,779, filed Nov. 3, 1981, now abandoned, which is a continuation in part of Ser. No. 159,848, filed June 16, 1980, now abandoned.

BACKGROUND OF THE INVENTION

1. Field of the Invention

This invention relates to a radiation image storage panel for obtaining a radiation image of an object having a fluorescent layer of a rare earth element activated complex fluorohalide phosphor.

2. Description of the Prior Art

Some kinds of phosphors emit fluorescent light when exposed to (excited by) visible light or infrared rays after exposure to ionizing radiations, ultraviolet rays, cathode rays, or the like. This kind of excitation is referred to as "stimulation", and the phosphor which emits fluorescent light upon stimulation is referred to as "stimulable phosphor". It is known that a stimulable phosphor can be used for a radiation image storage panel. That is, a radiation image of an object can be obtained by causing a panel composed of a stimulable phosphor to absorb a radiation passing through the object, exposing the panel to visible light or infrared rays to cause the stimulable phosphor to release the energy of the radiation stored therein as fluorescent light, and then detecting the fluorescent light.

In most cases of practical use of a radiation image storage panel, the object of the image is a human body. Accordingly, particularly when ionizing radiations such as X-rays or $\gamma$-rays are used, it is required for a stimulable phosphor employed in the radiation image storage panel to emit light of as high luminance as possible upon stimulation thereof to decrease a dose of ionizing radiations to which the object is exposed.

As a stimulable phosphor, a rare earth element activated barium fluorohalide phosphor represented by the following formula has been known in the art (see U.S. Pat. No. 4,239,968);

wherein X is at least one halogen selected from the group consisting of chlorine, bromine and iodine, Ln is at least one rare earth element selected from the group consisting of europium, cerium and terbium, and y is a number satisfying the condition of $0 \leq y \leq 0.2$.

Further, it has been known that a rare earth element activated barium fluorohalide phosphor represented by the following formula emits light of high luminance upon stimulation thereof;

wherein X and Ln have the same definitions as the above, and a and z are numbers satisfying the conditions of $0.90 \leq a \leq 1.05$ and $0 \leq z \leq 0.4$, respectively. When a and z are $a = 1$ and $0 \leq z \leq 0.2$, respectively, the phosphor corresponds to the above-mentioned rare earth element activated barium fluorohalide phosphor described in U.S. Pat. No. 4,239,968. When the above rare earth element activated divalent metal fluorohalide phosphor is employed in a radiation image storage panel as a fluorescent layer, in view of the abovementioned circumstances, the phosphor is desired to emit light of as high luminance as possible upon stimulation thereof.

SUMMARY OF THE INVENTION

Therefore, an object of the present invention is to enhance the luminance of light emitted by the radiation image storage panel having a fluorescent layer of the above-mentioned rare earth element activated divalent metal fluorohalide phosphor upon stimulation thereof.

In order to accomplish the above object, the inventors of the present invention conducted various investigations in the above-mentioned rear earth element activated divalent metal fluorohalide phosphor used for a fluorescent layer of the radiation image storage panel. As a result of the investigations, it was found that the luminance of light emitted by the rare earth element activated divalent metal fluorohalide phosphor upon stimulation thereof was enhanced by incorporating in the phosphor at least one fluoride selected from the group consisting of specific alkali metal fluorides, specific divalent metal fluorides and specific trivalent metal fluorides in a proper amount as the constituent of the host material of the phosphor.

The phosphor used for the radiation image storage panel of the present invention is a rare earth element activated complex halide phosphor represented by the formula

wherein X is at least one halogen selected from the group consisting of chlorine, bromine and iodine, $Me^I$ is at least one alkali metal selected from the group consisting of lithium and sodium, $Me^{II}$ is at least one divalent metal selected from the group consisting of beryllium, calcium and strontium, $Me^{III}$ is at least one trivalent metal selected from the group consisting of aluminum, gallium, yttrium and lanthanum, Ln is at least one rare earth element selected from the group consisting of divalent europium ($Eu^{2+}$), cerium and terbium, and a, b, c, d and e are numbers satisfying the conditions of $0.90 \leq a \leq 1.05$, $0 \leq b \leq 0.9$, $0 \leq c \leq 1.2$, $0 \leq d \leq 0.03$, $10^{-6} \leq e \leq 0.03$ and $b + d \neq 0$, respectively. From the viewpoint of the luminance of light emitted by the phosphor upon stimulation thereof, the numbers a, b, c, d and e should preferably satisfy the conditions of $0.95 \leq a \leq 1.02$, $0.01 \leq b \leq 0.5$, $0.01 \leq c \leq 0.2$, $0.0005 \leq d \leq 0.01$ and $10^{-4} \leq e \leq 0.01$, respectively.

The phosphor used for the radiation image storage panel of the present invention emits light of higher luminance than the conventional rare earth element activated divalent metal fluorohalide phosphor when it is stimulated by light of wavelength ranging from 450 to 800 nm after exposure to ionizing radiations such as X-rays or $\gamma$-rays, ultraviolet rays, cathode rays, or the like.

Therefore, the radiation image storage panel of the present invention has higher sensitivity than the conventional radiation image storage panel employing the conventional rare earth element activated divalent metal fluorohalide phosphor.

DETAILED DESCRIPTION OF THE INVENTION

Figure 1:
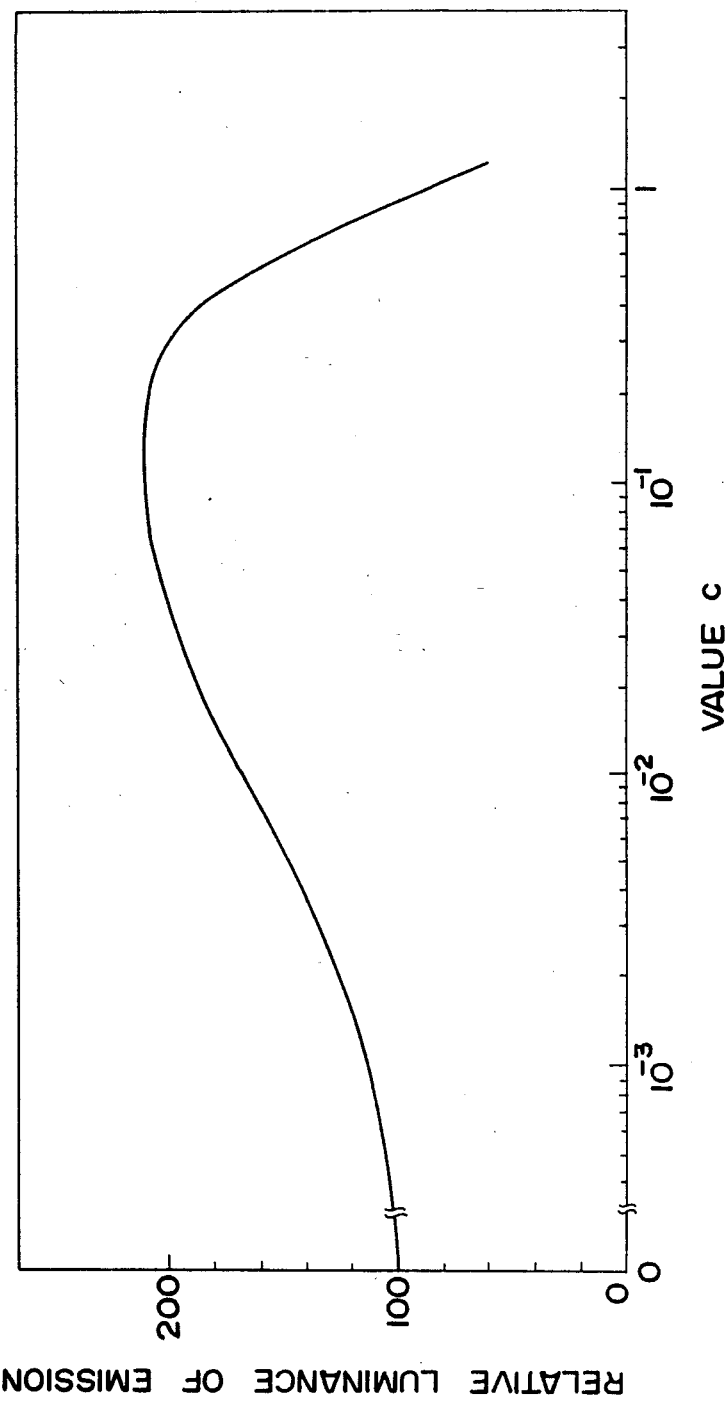
FIG. 1 is a graph showing the relationship between the value b of the $BaF_2.BaX_2.bMe^IF:0.0005Ln$ phosphor used for the radiation image storage panel of the present invention and the luminance of light emitted by the phosphor upon stimulation thereof.

The present invention will hereinbelow be described in detail.

The phosphor used for the radiation image storage panel of the present invention is prepared by the following process.

The following raw materials are used;
(i) barium fluoride ($BaF_2$),
(ii) at least one barium halide selected from the group consisting of barium chloride ($BaCl_2$), barium bromide ($BaBr_2$) and barium iodide ($BaI_2$),
(iii) at least one fluoride selected from the group consisting of lithium fluoride (LiF), sodium fluoride (NaF), beryllium fluoride ($BeF_2$), calcium fluoride ($CaF_2$), strontium fluoride ($SrF_2$), aluminum fluoride ($AlF_3$), gallium fluoride ($GaF_3$), yttrium fluoride ($YF_3$) and lanthanum fluoride ($LaF_3$), and
(iv) at least one rare earth element compound selected from the group consisting of europium compounds, cerium compounds and terbium compounds such as chloride, fluoride, bromide, nitrate, oxide, and the like.

The above-mentioned raw materials are weighed out in such a ratio that a raw material mixture stoichiometrically represented by the following formula is obtained, and mixed well by means of a ball mill, a mixer mill, or the like;

$$BaF_2.aBaX_2.bMe^IF.cMe^{II}F_2.dMe^{III}F_3:eLn$$

wherein X is at least one halogen selected from the group consisting of chlorine, bromine and iodine, $Me^I$ is at least one alkali metal selected from the group consisting of lithium and sodium, $Me^{II}$ is at least one divalent metal selected from the group consisting of beryllium, calcium and strontium, $Me^{III}$ is at least one trivalent metal selected from the group consisting of aluminum, gallium, yttrium and lanthanum, Ln is at least one rare earth element selected from the group consisting of europium, cerium and terbium, and a, b, c, d and e are numbers satisfying the conditions of $0.90 \leq a \leq 1.05$, $0 \leq b \leq 0.9$, $0 \leq c \leq 1.2$, $0 \leq d \leq 0.03$, $10^{-6} \leq e \leq 0.03$ and $b+d \neq 0$, respectively.

Then, the raw material mixture is put into a heat-resistant container such as an alumina crucible, a quartz crucible, or the like and fired in an electric furnace. The firing is performed at a temperature ranging from 600° to 1000° C., preferably ranging from 700° to 900° C. Although the firing period is determined depending upon the amount of the raw material mixture placed in the heat-resistant container, the firing temperature employed and so forth, the firing period is generally within the range of 1 to 6 hours. Although the firing may be performed in the air, the firing is preferably performed in an inert atmosphere such as an argon gas atmosphere or a nitrogen gas atmosphere, or in a weak reducing atmosphere such as a nitrogen gas atmosphere containing a small amount of hydrogen gas or a carbon vapor atmosphere. Among the phosphors included in the rare earth element activated complex halide phosphor using for the radiation image storage panel of the present invention, the phosphor activated with divalent europium is very useful practically. In the preparation of the phosphor, a compound of trivalent europium is used as a raw material of europium, and the trivalent europium is reduced to divalent europium during the firing. Accordingly, when the phosphor activated with divalent europium is prepared, the firing should be performed in a weak reducing atmosphere. The luminance of light emitted by the phosphor used for the radiation image storage panel of the present invention can further be enhanced by firing the raw material mixture under the firing conditions mentioned above, taking out the fired product from the furnace, pulverizing the fired product and then refiring the pulverized product under the same firing conditions. After the firing, the fired product is subjected to the processes generally employed in the production of a phosphor such as pulverizing and sieving to obtain the phosphor of the present invention.

The rare earth element activated complex halide phosphor used for the radiation image storage panel of the present invention thus prepared exhibits emission of higher luminance than the conventional rare earth element activated divalent metal fluorohalide phosphor upon stimulation thereof.

Figure 2:
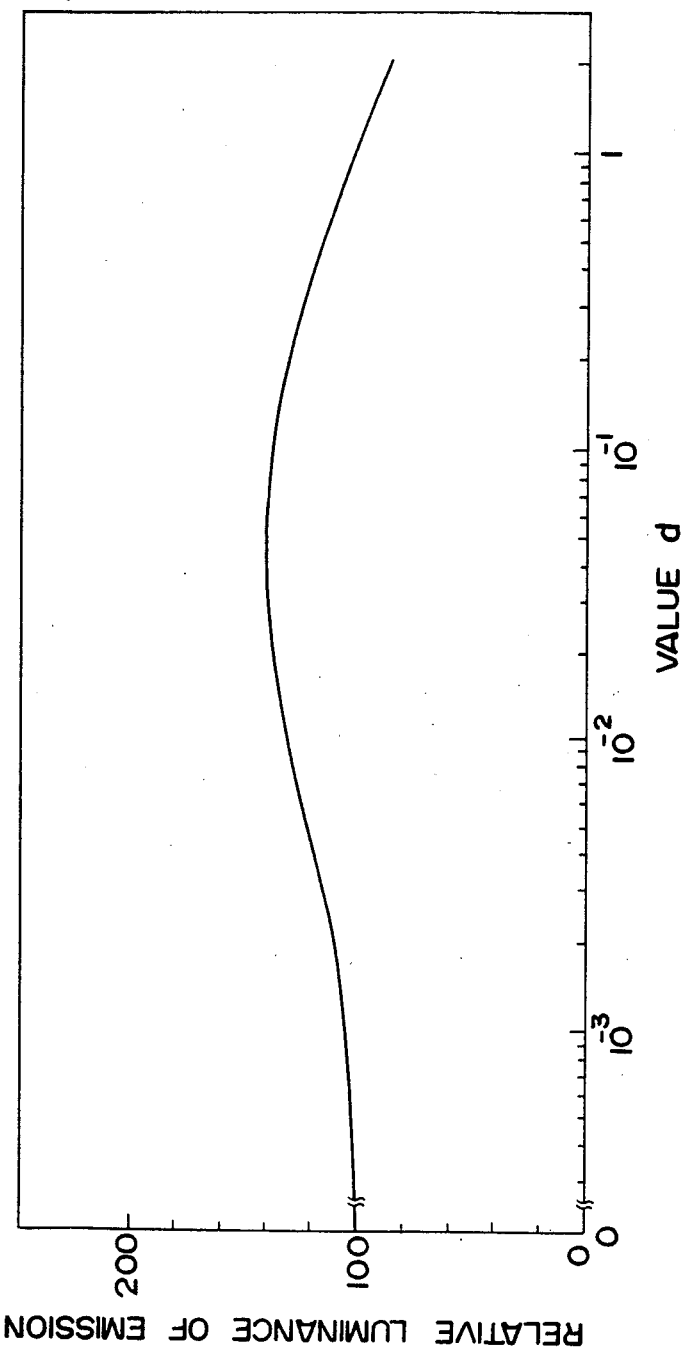
FIG. 2 is a graph showing the relationship between the value c of the $BaF_2.BaX_2.cMe^{II}F_2:0.0005Ln$ phosphor used for the radiation image storage panel of the present invention and the luminance of light emitted by the phosphor upon stimulation thereof.
Figure 3:
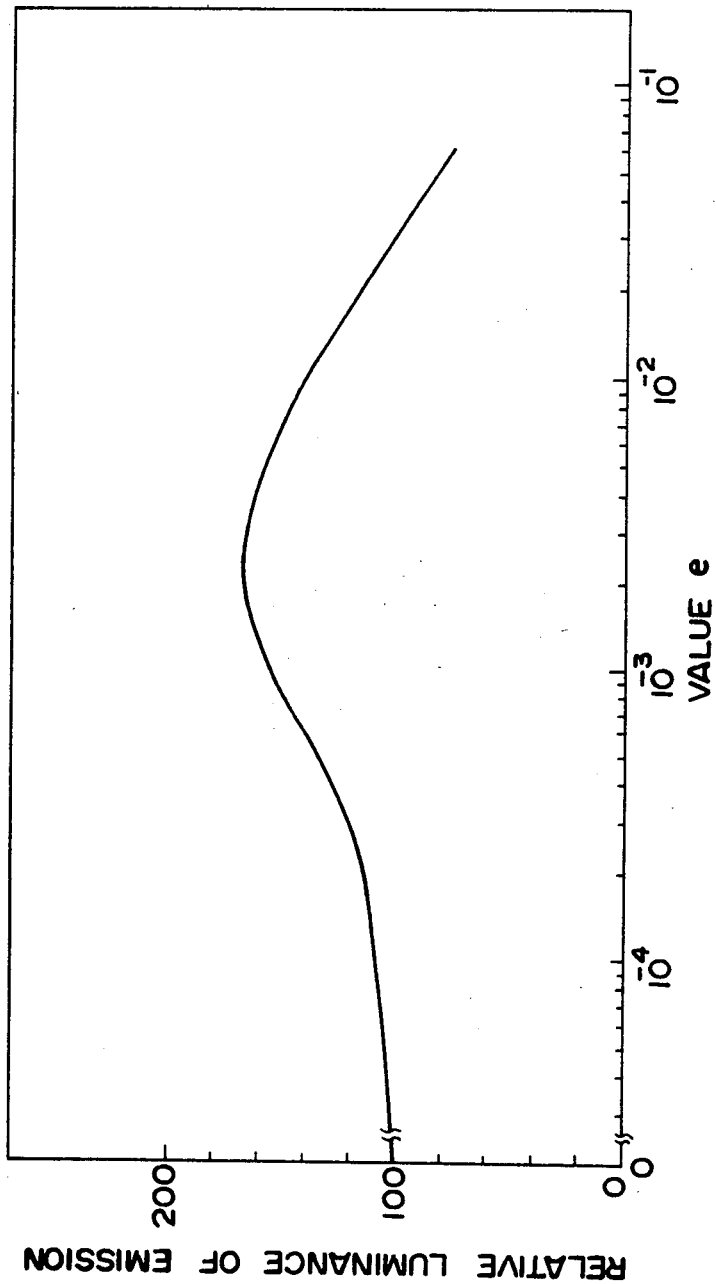
FIG. 3 is a graph showing a relationship between the value d of the $BaF_2.BaX_2.dMe^{III}F_3:0.0005Ln$ phosphor used for the radiation image storage panel of the present invention and the luminance of light emitted by the phosphor upon stimulation thereof.

Referring to FIGS. 1, 2 and 3, the amounts of $Me^IF$, $Me^{II}F_2$, and $Me^{III}F_3$ (viz., values b, c and d, respectively) of the phosphor used for the radiation image storge panel of the present invention will hereinbelow be described.

FIG. 1 is a graph showing the relationship between the amount of $Me^IF$ (value b) of the $BaF_2.BaX_2.bMe^IF:0.0005Ln$ phosphor and the luminance of light emitted by the phosphor upon stimulation thereof. The data shown in FIG. 1 is one measured for the phosphor wherein X, $Me^I$ and Ln are bromine, lithium and divalent europium, respectively (viz., the $BaF_2.BaBr_2.bLiF:0.0005Eu^{2+}$ phosphor). The measurement of the luminance was performed by exposing the phosphor to X-rays of 80 KVp, and then stimulating the phosphor with light of 630 nm which was obtained by causing the light emitted by a xenon lamp in a spectroscope to pass through a diffraction grating. In FIG. 1, the luminance of emission (ordinate axis) is represented by the relative value with respect to that of the conventional $BaF_2.BaX_2:0.0005Ln$ phosphor in which $Me^IF$ is not incorporated (viz., the $BaF_2.BaBr_2:0.0005Eu^{2+}$ phosphor) defined to be 100.

As is clear from FIG. 1, when the value b is $0 < b \leq 0.9$, the $BaF_2.BaX_2.bMe^IF:0.0005Ln$ phosphor emits light of higher luminance than the conventional $BaF_2.BaX_2:0.0005Ln$ phosphor upon stimulation thereof. In particular, when the value b is $0.01 \leq b \leq 0.5$, the $BaF_2.BaX_2.bMe^IF:0.0005Ln$ phosphor emits light of markedly high luminance upon stimulation thereof.

Although FIG. 1 shows the date measured for the $BaF_2.BaBr_2.bLiF:0.0005Eu^{2+}$ phosphor as described above, it was confirmed that the results similar to that shown in FIG. 1 were also obtained with respect to other phosphors included in the $BaF_2.BaX_2.bMe^IF$:0.0005Ln phosphor. Further, it was confirmed that the results similar to that shown in FIG. 1 were also obtained with respect to other phosphors wherein $Me^{II}F_2$ and/or $Me^{III}F_3$ was incorporated together with $Me^IF$.

FIG. 2 is a graph showing the relationship between the amount of $Me^{II}F_2$ (value c) of the $BaF_2.BaX_2.cMe^{II}F_2$:0.0005Ln phosphor and the luminance of light emitted by the phosphor upon stimulation thereof. The data shown in FIG. 2 is one measured for the phosphor wherein X, $Me^{II}$ and Ln are bromine, calcium and divalent europium, respectively (viz., the $BaF_2.BaBr_2.cCaF_2$:0.0005$Eu^{2+}$ phosphor). The measurement of the luminance was performed in the same manner as described in FIG. 1. In FIG. 2, the luminance of emission (ordinate axis) is represented by the relative value with respect to that of the conventional $BaF_2.BaX_2$:0.0005Ln phosphor in which $Me^{II}F_2$ is not incorporated (viz., the $BaF_2.BaBr_2$:0.0005$Eu^{2+}$ phosphor) defined to be 100.

As is clear from FIG. 2, when the value c is $0 < c \leq 1.2$, the $BaF_2.BaX_2.cMe^{II}F_2$:0.0005Ln phosphor emits light of higher luminance than the conventional $BaF_2.BaX_2$:0.0005Ln phosphor upon stimulation thereof. In particular, when the value c is $0.01 \leq c \leq 0.2$, the $BaF_2.BaX_2.cMe^{II}F_2$:0.0005Ln phosphor emits light of markedly high luminance upon stimulation thereof.

Although FIG. 2 shows the data measured for the $BaF_2.BaBr_2.cCaF_2$:0.0005$Eu^{2+}$ phosphor as described above, it was confirmed that the results similar to that shown in FIG. 2 were also obtained with respect to other phosphors included in the $BaF_2.BaX_2.cMe^{II}F_2$:0.0005Ln phosphor. Further, it was confirmed that the results similar to that shown in FIG. 2 were also obtained with respect to other phosphors wherein $Me^IF$ and/or $Me^{III}F_3$ was incorporated together with $Me^{II}F_2$.

FIG. 3 is a graph showing the relationship between the amount of $Me^{III}F_3$ (value d) of the $BaF_2.BaX_2.dMe^{III}F_3$:0.0005Ln phosphor and the luminance of light emitted by the phosphor upon stimulation thereof. The data shown in FIG. 3 is one measured for the phosphor wherein X, $Me^{III}$ and Ln are bromine, aluminum and divalent europium, respectively (viz., the $BaF_2.BaBr_2.dAlF_3$:0.0005$Eu^{2+}$ phosphor). The measurement of the luminance of emission was performed in the same manner as described in FIG. 1. In FIG. 3, the luminance of emission (ordinate axis) is represented by the relative value with respect to that of the conventional $BaF_2.BaX_2$:0.0005Ln phosphor in which $Me^{III}F_3$ is not incorporated (viz., the $BaF_2.BaBr_2$:0.0005$Eu^{2+}$ phosphor) defined to be 100.

As is clear from FIG. 3, when the value d is $0 < d \leq 0.03$, the $BaF_2.BaX_2.dMe^{III}F_3$:0.0005Ln phosphor emits light of higher luminance than the conventional $BaF_2.BaX_2$:0.0005Ln phosphor upon stimulation thereof. In particular, when the value d is $0.0005 \leq d \leq 0.01$, the $BaF_2.BaX_2.dMe^{III}F_3$:0.0005Ln phosphor emits light of markedly high luminance upon stimulation thereof.

Although FIG. 3 shows the data measured for the $BaF_2.BaBr_2.dAlF_3$:0.0005$Eu^{2+}$ phosphor as described above, it was confirmed that the results similar to that shown in FIG. 3 were also obtained with respect to other phosphors included in the $BaF_2.BaX_2.dMe^{III}F_3$:0.0005Ln phosphor. Further, it was confirmed that the results similar to that shown in FIG. 3 were also obtained with respect to other phosphors wherein $Me^IF$ and/or $Me^{II}F_2$ was incorporated together with $Me^{III}F_3$.

From the above description referring to FIGS. 1 to 3, it is concluded that the values b, c and d of said phosphor are numbers satisfying the conditions of $0 \leq b \leq 0.9$, $0 \leq c \leq 1.2$, and $0 \leq d \leq 0.03$, respectively. The numbers b, c and d should preferably satisfy the conditions of $0.01 \leq b \leq 0.5$, $0.01 \leq c \leq 0.2$ and $0.0005 \leq d \leq 0.01$, respectively.

As described hereinabove, the phosphor used for the radiation image storage panel of the present invention emits light of higher luminance than the conventional rare earth element activated divalent metal fluorohalide phosphor when stimulated by light of wavelength ranging from 450 to 800 nm after exposure to ionizing radiations such as X-rays or $\gamma$-rays, ultraviolet rays, cathode rays, or the like. Accordingly, the radiation image storage panel of the present invention incorporating a fluorescent layer formed of above-mentioned phosphor has a high sensitivity than the radiation image storage panel employing the conventional rare earth element activated divalent metal fluorohalide phosphor.

Now, the radiation image storage panel of the present invention will be described in detail.

Figure 4:
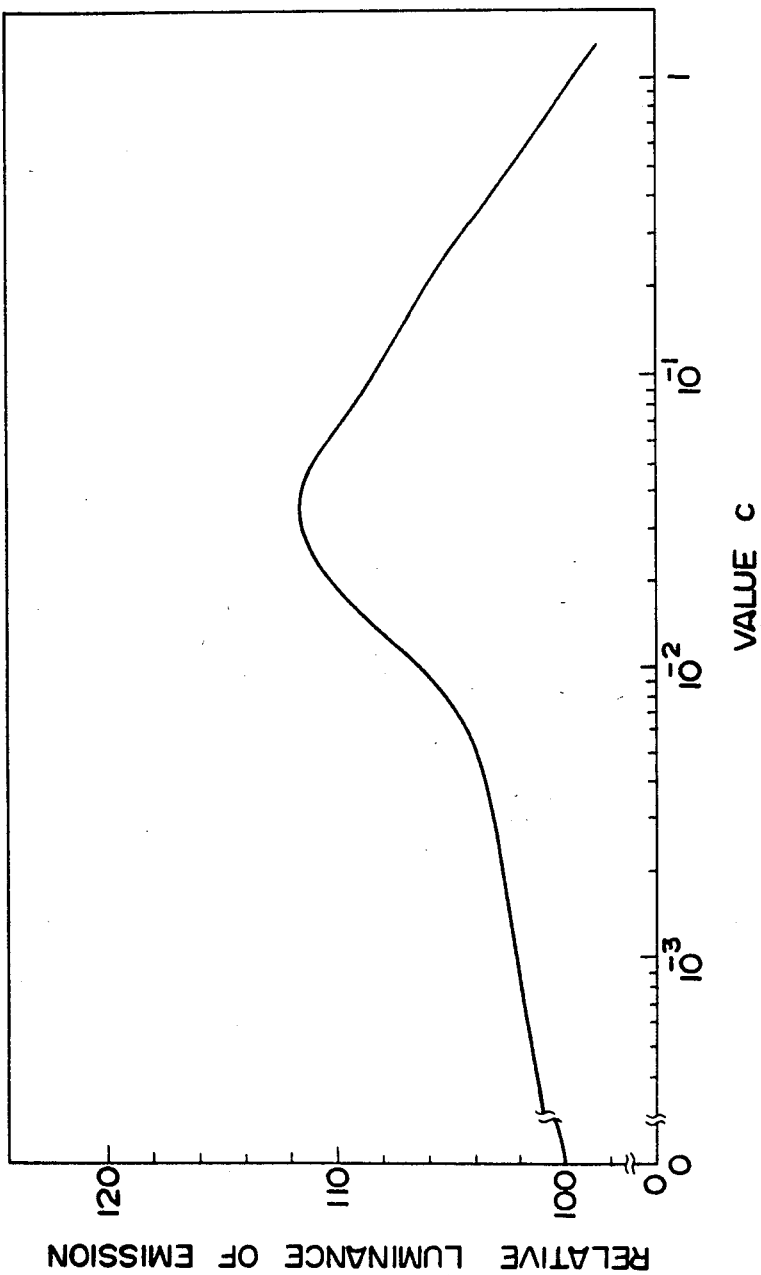
FIGS. 4A, 4B and 4C are cross-sectional views of embodiments of a radiation image storage panel of the present invention.
Figure 5:
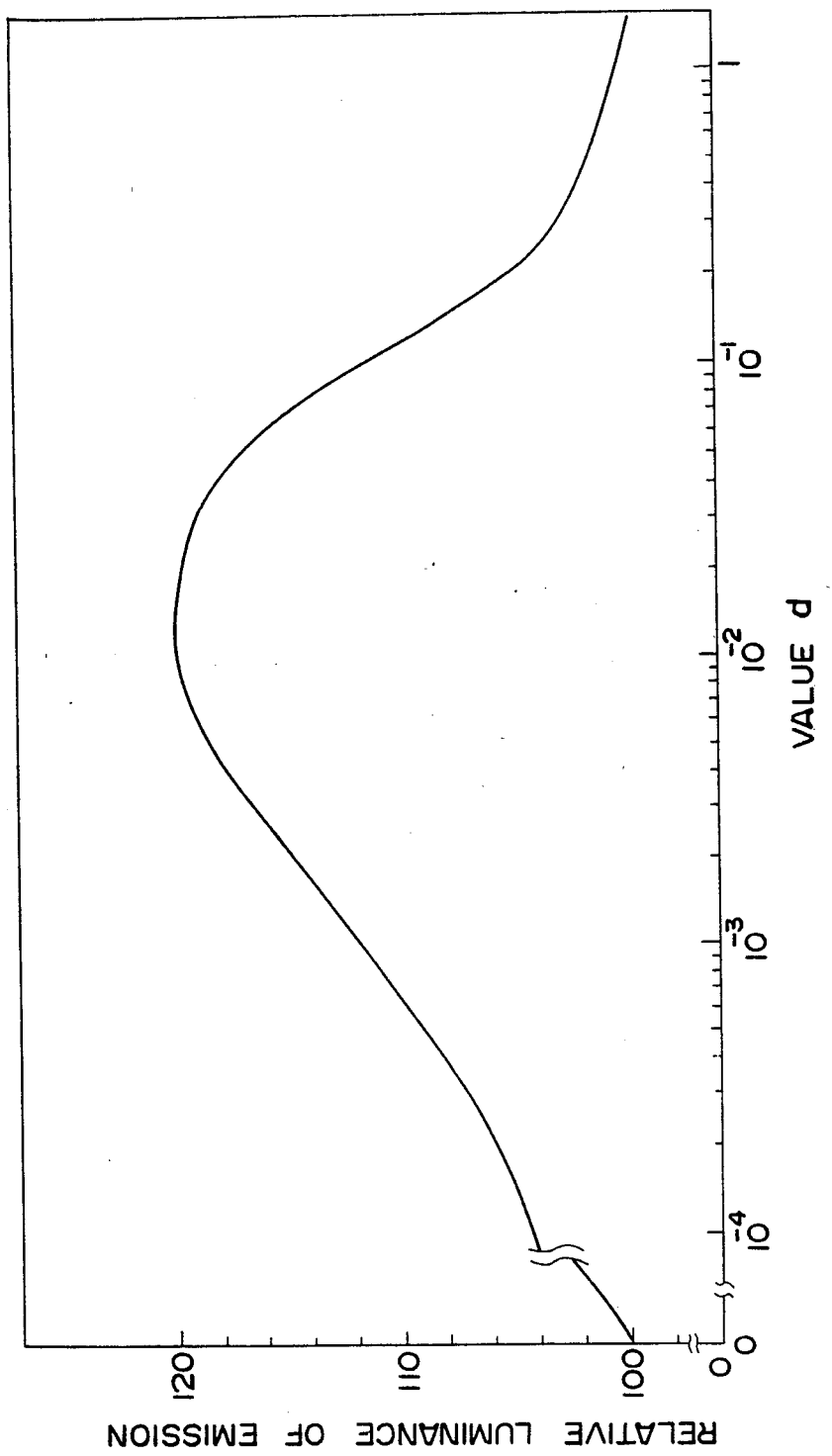
Figure 6:
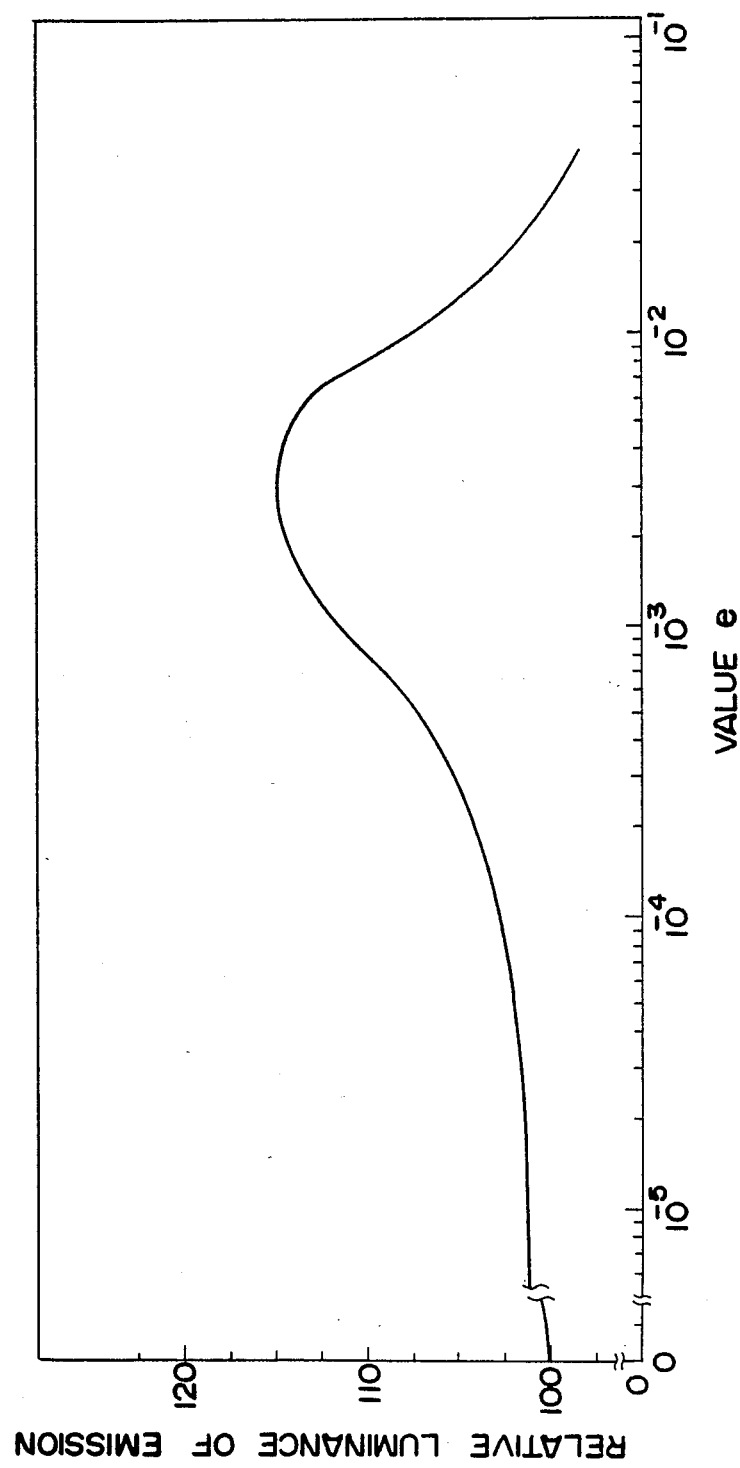

The radiation image storage panel of this invention incorporates a fluorescent layer formed of the aforementioned a rare earth element activated complex fluorohalide phosphor. Generally, the fluorescent layer is formed by having the phosphor dispersed in a suitable binder. If the fluorescent layer possesses a self-supporting property, then the fluorescent layer itself can constitute a radiation image storage panel. Generally, as shown in FIG. 4A, the radiation image storage panel is formed by having the fluorescent layer 1 deposited on one surface of a sheet-like support 2. Ordinarily, as shown in FIG. 4B, the surface of the fluorescent layer 1 (the surface opposite that of the support for the fluorescent layer) is coated with a protective film 6 serving to protect the fluorescent layer 1 physically and chemically. For the purpose of heightening the fastness of adhesion between the fluorescent layer and the support, a layer of undercoat may be interposed between the fluorescent layer and the support. Further, as shown in FIG. 4C, the radiation image storage panel may be produced by sandwiching a fluorescent layer 1 having a proper thickness between two glass plates 3 and 4, and then sealing the edges of the fluorescent layer.

Generally, the radiation image storage panel of the present invention is produced as follows. First, a phosphor coating dispersion is prepared by mixing 1 part by weight of a rare earth element activated complex fluorohalide phosphor with 0.01 to 1 part by weight of a binder. This coating dispersion is applied by a suitable method to the upper surface of a support set horizontally and then allowed to dry. Consequently, a fluorescent layer is formed on the support and a radiation image storage panel is completed. As the binder, there can be used any of the binders such as nitrocellulose, vinyl chloride-vinyl acetate copolymer, polyvinyl butyral, polyvinyl acetate, and polyurethan which are adopted ordinarily for the formation of layers. As the support, there can be used any of the sheet-like materials such plastic sheet, glass sheet, paper, and metal sheet. For the convenience of handling, the support is desired to possess flexibility and excel in fabricability. Examples of desirable supports, therefore, are plastic sheets including polyester film, polyethylene terephthalate film, and cellulose acetate film and paper. The thickness of the fluorescent layer is suitably selected within the range of from 10 to 1000μ. The protective film for the fluorescent layer in the radiation image storage panel is formed by directly applying to the upper surface of the fluorescent layer obtained as described above a coating liquid prepared by dissolving in a suitable solvent the resin of polyvinyl chloride, polyethylene terephthalate, polymethacrylate, or cellulose acetate and allowing the applied film of the liquid to dry or by applying to the surface of the fluorescent layer a transparent film formed separately of such a resin in advance.

The present invention will hereinbelow be described referring to an example.

EXAMPLE

The following 14 kinds of combinations of raw materials were weighed out and each combination was mised well by means of a ball mill to prepare 14 kinds of raw material mixtures (1) to (14).

(1) 175.3 grams (1 mol) of $BaF_2$, 297.1 grams (1 mol) of $BaBr_2$, 5.2 grams (0.2 mols) of LiF and 0.129 grams (0.0005 mols) of $EuCl_3$ (2) 175.3 grams (1 mol) of $BaF_2$, 294.1 grams (0.99 mols) of $BaBr_2$, 0.25 grams (0.003 mols) of $AlF_3$ and 0.026 grams (0.0001 mols) of $EuCl_3$ (3) 175.3 grams (1 mol) of $BaF_2$, 297.1 grams (1 mol) of $BaBr_2$, 0.98 grams (0.005 mols) of $LaF_3$ and 0.052 grams (0.0002 mols) of $EuCl_3$ (4) 175.3 grams (1 mol) of $BaF_2$, 294.1 grams (0.99 mols) of $BaBr_2$, 0.26 grams (0.01 mols) of LiF, 0.42 grams (0.01 mols) of NaF and 0.077 grams (0.0003 mols) of $EuCl_3$ (5) 175.3 grams (1 mol) of $BaF_2$, 294.1 grams (0.99 mols) of $BaBr_2$, 0.52 grams (0.02 mols) of LiF, 0.17 grams (0.002 mols) of $AlF_3$ and 0.129 grams (0.0005 mols) of $EuCl_3$ (6) 175.3 grams (1 mol) of $BaF_2$, 297.1 grams (1 mol) of $BaBr_2$, 0.26 grams (0.01 mols) of LiF, 15.6 grams (0.2 mols) of $CaF_2$, 0.08 grams (0.001 mols) of $AlF_3$ and 0.129 grams (0.0005 mols) of $EuCl_3$ (7) 175.3 grams (1 mol) of $BaF_2$, 210.3 grams (1.01 mols) of $BaCl_2$, 4.2 grams (0.1 mols) of NaF and 0.104 grams (0.0005 mols) of $EuF_3$ (8) 175.3 grams (1 mol) of $BaF_2$, 208.2 grams (1 mol) of $BaCl_2$, 0.26 grams (0.01 mols) of LiF, 12.6 grams (0.1 mols) of $SrF_2$ and 0.104 grams (0.0005 mols) of $EuF_3$ (9) 175.3 grams (1 mol) of $BaF_2$, 237.7 grams (0.8 mols) of $BaBr_2$, 39.6 grams (0.19 mols) of $BaCl_2$, 2.4 grams (0.05 mols) of $BeF_2$, 0.08 grams (0.001 mols) of $AlF_3$ and 0.104 grams (0.0005 mols) of $EuF_3$

(10) 175.3 grams (1 mol) of $BaF_2$, 208.2 grams (1 mol) of $BaCl_2$, 1.3 grams (0.01 mols) of $GaF_3$, 0.026 grams (0.0001 mols) of $EuCl_3$ and 0.005 grams (0.00002 mols) of $TbCl_3$

(11) 175.3 grams (1 mol) of $BaF_2$, 297.1 grams (1 mol) of $BaBr_2$, 1.5 grams (0.01 mols) of $YF_3$, 0.042 grams (0.0002 mols) of $EuF_3$ and 0.007 grams (0.00002 mols) of $Ce(NO_3)_3$

(12) 175.3 grams (1 mol) of $BaF_2$, 291.2 grams (0.98 mols) of $BaBr_2$, 0.08 grams (0.001 mols) of $AlF_3$, 0.13 grams (0.001 mols) of $GaF_3$, 0.026 grams (0.0001 mols) of $EuCl_3$ and 0.0025 grams (0.00001 mols) of $TbCl_3$

(13) 175.3 grams (1 mol) of $BaF_2$, 285.2 grams (0.96 mols) of $BaBr_2$, 11.7 grams (0.03 mols) of $BaI_2$, 0.52 grams (0.02 mols) of LiF and 0.077 grams (0.0003 mols) of $EuCl_3$

(14) 175.3 grams (1 mol) of $BaF_2$, 288.2 grams (0.97 mols) of $BaBr_2$, 11.7 grams (0.03 mols) of $BaI_2$, 0.26 grams (0.01 mols) of LiF, 0.78 grams (0.01 mols) of $CaF_2$ and 0.063 grams (0.0003 mols) of $EuF_3$ Then, the raw material mixtures (1) to (14) obtained were put into respective alumina crucibles and fired in an electric furnace. The raw material mixtures (1) to (12) were fired at a temperature of 850° C. for 3 hours in a carbon vapor atmosphere. The raw material mixtures (13) and (14) were fired at a temperature of 800° C. for 3 hours in a nitrogen gas atmosphere containing 2% of hydrogen gas. After the firing, the fired products of the mixtures (1) to (14) obtained were taken out of the furnace, cooled in the air, and then pulverized. The pulverized products (1) to (14) were sieved using a sieve of 150 mesh to obtain phosphors (1) to (14), respectively.

14 kinds of coating dispersion having a viscosity of 50 centi-stokes were prepared by mixing 8 parts by weight of each of above-mentioned rare earth element activated complex fluorohalide phosphors (1) to (14) and 1 part by weight of a nitrocellulose using a solvent (a mixture of acetone, ethyl acetate and butyl acetate), respectively. Then, each coating dispersion was uniformly applied to a holizontally placed polyethylene terephthalate film (support base) and dried naturally for one day to form a fluorescent layer of about 300μ thick thereon. Thereafter, a nitrocellulose was applied on each fluorescent layer and dried at 50° C. to form a protective layer thereon having a thickness of about 10μ. Thus, 14 kinds of radiation image storage panels (1) to (14) were prepared.

Then, the luminance of light emitted by radiation image storage panels (1) to (14) upon stimulation thereof was measured. The measurement of the luminance was performed by exposing each radiation image storage panel to X-rays of 80 KVp, and then stimulating each fluorescent layer of the radiation image storage panel with light of 630 nm which was obtained by causing the light emitted by a xenon lamp in a spectroscope to pass through a diffraction grating.

As shown in the table below, the luminance of emission of any one of radiation image storage panels (1) to (14) upon stimulation thereof was higher than that of the corresponding conventional radiation image storage panel employing a conventional rare earth element activated divalent metal fluorohalide phosphor measured under the same conditions.

| Phosphor | Formula of the Phosphor | Luminance* |
| --- | --- | --- |
| Conventional (1) | $BaF_2.BaBr_2: 0.0005Eu^{2+}$ | 100 |
| | $BaF_2.BaBr_2.0.2LiF: 0.0005Eu^{2+}$ | 210 |
| Conventional (2) | $BaF_2.0.99BaBr_2: 0.0001Eu^{2+}$ | 100 |
| | $BaF_2.0 99BaBr_2.0.003AlF_3: 0.0001Eu^{2+}$ | 165 |
| Conventional (3) | $BaF_2.BaBr_2: 0.0002Eu^{5+}$ | 100 |
| | $BaF_2.BaBr_2.0.005LaF_3: 0.0002Eu^{2+}$ | 110 |
| Conventional (4) | $BaF_2.0.99BaBr_2: 0.0003Eu^{2+}$ | 100 |
| | $BaF_2.0.99BaBr_2.0.02(Li_{0.5},Na_{0.5})F: 0.0003Eu^{2+}$ | 125 |
| Conventional (5) | $BaF_2.0.99BaBr_2: 0.0005Eu^{2+}$ | 100 |
| | $BaF_2.0.99BaBr_2.0.02LiF.0.002AlF_3: 0.0005Eu^{2+}$ | 170 |
| Conventional (6) | $BaF_2.BaBr_2: 0.0005Eu^{2+}$ | 100 |
| | $BaF_2.BaBr_2.0.01LiF.0.2CaF_2. 0.001AlF_3: 0.0005Eu^{2+}$ | 115 |
| Conventional (7) | $BaF_2.1.01BaCl_2: 0.0005Eu^{2+}$ | 100 |
| | $BaF_2.1.01BaCl_2.0.1NaF: 0.0005Eu^{2+}$ | 110 |
| Conventional | $BaF_2.BaCl_2: 0.0005Eu^{2+}$ | 100 |

-continued

| Phosphor | Formula of the Phosphor | Luminance* |
|---|---|---|
| (8) | $BaF_2.BaCl_2.0.01LiF.0.1SrF_2$: $0.0005Eu^{2+}$ | 120 |
| Conventional | $BaF_2.0.99Ba(Br_{0.81},Cl_{0.19})_2$: $0.0005Eu^{2+}$ | 100 |
| (9) | $BaF_2.0.99Ba(Br_{0.81},Cl_{0.19})_2$ $.0.05BeF_2. 0.001AlF_3$: $0.0005Eu^{2+}$ | 130 |
| Conventional | $BaF_2.BaCl_2$: $0.0001Eu^{2+},0.00002Tb$ | 100 |
| (10) | $BaF_2.BaCl_2.0.01CaF_3$: $0.0001Eu^{2+}$, $0.00002Tb$ | 120 |
| Conventional | $BaF_2.BaBr_2$: $0.0002Eu^{2+},0.00002Ce$ | 100 |
| (11) | $BaF_2.BaBr_2.0.01YF_3$: $0.0002Eu^{2+}$, $0.0002Ce$ | 120 |
| Conventional | $BaF_2.0.98BaBr_2$: $0.0001Eu^{2+}$, $0.0001Tb$ | 100 |
| (12) | $BaF_2.0.98BaBr_2.0.002$ $(Al_{0.5},Ga_{0.5})F_3$: $0.0001Eu^{2+},0.00001Tb$ | 135 |
| Conventional | $BaF_2.0.99Ba(Br_{0.97},I_{0.03})_2$: $0.0003Eu^{2+}$ | 100 |
| (13) | $BaF_2.0.99Ba(Br_{0.97},I_{0.03})_2$ $.0.02LiF$: $0.0003Eu^{2+}$ | 130 |
| Conventional | $BaF_2.Ba(Br_{0.97},I_{0.03})_2$: $0.0003Eu^{2+}$ | 100 |
| (14) | $BaF_2.Ba(Br_{0.97},I_{0.03})$ $_2.0.01LiF.0.01CaF_2$: $0.0003Eu^{2+}$ | 120 |

*The luminance of emission is represented by a relative value with reference to that of the conventional phosphor defined to be 100.

We claim:

1. A method for obtaining a radiation image of an object, said method comprising the steps of causing a radiation image storage panel to absorb an ionizing radiation transmitted through said object and then exposing the panel to light of wavelength ranging from 450 to 800 nm to cause the panel to release radiation energy stored therein as fluorescent light, wherein said panel has a fluorescent layer of a rare earth element activated complex halide stimulable phosphor represented by the formula $$BaF_2.aBaX_2.bNaF.cMe^{II}F_2.dGaF_3:eLn$$

wherein X is at least one halogen selected from the group consisting of chlorine, bromine and iodine, $Me^{II}$ is at least one divalent metal selected from the group consisting of beryllium, calcium and strontium Ln is at least one rare earth element selected from the group consisting of a divalent europium ($Eu^{2+}$), cerium and terbium, and a, b, c, d and e are numbers satisfying the conditions of $0.90 \leq a \leq 1.05$, $0 \leq b \leq 0.9$, $0 \leq c \leq 1.2$, $0 \leq d \leq 0.03$, $10^{-6} \leq e \leq 0.03$ and $b+d \neq 0$, respectively.

2. A method as in claim 1 wherein said b, c and d are $b \neq 0$, $c \neq 0$ and $d=0$, respectively.

3. A method as in claim 1 wherein said a, b, c and e are $0.95 \leq a \leq 1.02$, $0.01 \leq b \leq 0.05$, $0.01 \leq c \leq 0.2$ and $10^{-4} \leq e \leq 0.01$, respectively.

4. A method as in claim 1 wherein said b is a number satisfying the condition of $0.01 \leq b \leq 0.5$.

5. A method as defined in claim 1 wherein said d is a number satisfying the condition of $0.0005 \leq d \leq 0.01$.

* * * * *